US008856392B2

(12) United States Patent
Myrah et al.

(10) Patent No.: US 8,856,392 B2
(45) Date of Patent: Oct. 7, 2014

(54) DIVIDING A PORT INTO SMALLER PORTS

(75) Inventors: Michael G. Myrah, Cypress, TX (US);
Balaji Natrajan, Spring, TX (US);
Sohail Hameed, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 157 days.

(21) Appl. No.: 13/549,964

(22) Filed: Jul. 16, 2012

(65) Prior Publication Data

US 2014/0019657 A1    Jan. 16, 2014

(51) Int. Cl.
*G06F 13/14*    (2006.01)
(52) U.S. Cl.
USPC ............ 710/10; 710/9; 710/38; 710/104; 710/300; 710/305
(58) Field of Classification Search
USPC ...................................................... 710/300
See application file for complete search history.

(56) References Cited

U.S. PATENT DOCUMENTS

| | | | |
|---|---|---|---|
| 7,290,066 B2 * | 10/2007 | Voorhees et al. ................ 710/5 |
| 7,376,789 B2 * | 5/2008 | Halleck et al. ................ 711/118 |
| 7,451,255 B2 * | 11/2008 | Gustafson et al. ............ 710/62 |
| 7,584,319 B1 * | 9/2009 | Liao et al. .................... 710/317 |
| 7,644,204 B2 | 1/2010 | Marripudi | |
| 7,719,287 B2 * | 5/2010 | Marks et al. .................. 324/542 |
| 7,760,642 B2 | 7/2010 | Plamondon | |
| 7,913,037 B2 | 3/2011 | Nakajima | |
| 8,086,773 B2 * | 12/2011 | Nakajima ....................... 710/74 |
| 8,219,719 B1 * | 7/2012 | Parry et al. ...................... 710/8 |
| 8,407,384 B2 * | 3/2013 | Nakajima ....................... 710/74 |
| 8,483,087 B2 * | 7/2013 | Bose et al. .................... 370/254 |
| 2005/0210159 A1 * | 9/2005 | Voorhees et al. ................ 710/5 |
| 2006/0112219 A1 | 5/2006 | Chawla | |
| 2007/0094472 A1 * | 4/2007 | Marks et al. .................. 711/170 |
| 2008/0244139 A1 * | 10/2008 | Nakajima ..................... 710/300 |
| 2011/0004707 A1 | 1/2011 | Spry | |
| 2013/0132782 A1 * | 5/2013 | Wiran .......................... 714/47.2 |

OTHER PUBLICATIONS http://docs.oracle.com—Sun Storage 2500-M2 Arrays Hardware Release Notes, Release 6.8 dated on or before Jun. 13, 2012 (34 pages).
INCITS, Working Draft American National Standard, Project T10/2124-D, Information Technology—SAS Protocol Layer (SPL), Revision 07, Jul. 21, 2010 (722 pages).
HP, Serial Attached SCSI Storage Technology, 2nd Edition, Jun. 2009 (18 pages).
INCITS, Working Draft American National Standard, Project T10/1760-D, Information Technology—Serial Attached SCSI-2 (SAS-2), Revision 16, Apr. 18, 2009 (923 pages).
Myrah et al., U.S. Appl. No. 12/749,784 entitled Performing Power Management Based on Information Regarding Zones of Devices in a System filed Mar. 30, 2010 (31 pages).

* cited by examiner

*Primary Examiner* — Ryan Stiglic

(57) ABSTRACT

A given port at a storage controller is used for communication with storage devices. In response to an indication that at least a portion of the given port is to be dedicated to a group of at least one of the storage devices, the storage controller divides the given port into multiple smaller ports.

19 Claims, 4 Drawing Sheets

DIVIDING A PORT INTO SMALLER PORTS

BACKGROUND

A storage system can include a collection of storage devices and a storage controller that manages access of the storage devices. Data requests (read requests, write requests, etc.) received by the storage controller causes the storage controller to issue corresponding commands to access the storage devices. The commands sent from the storage controller to the storage devices can be passed through intermediate devices, which can include switches, expanders, and so forth.

BRIEF DESCRIPTION OF THE DRAWINGS

Some embodiments are described with respect to the following figures.

DETAILED DESCRIPTION

Figure 1:
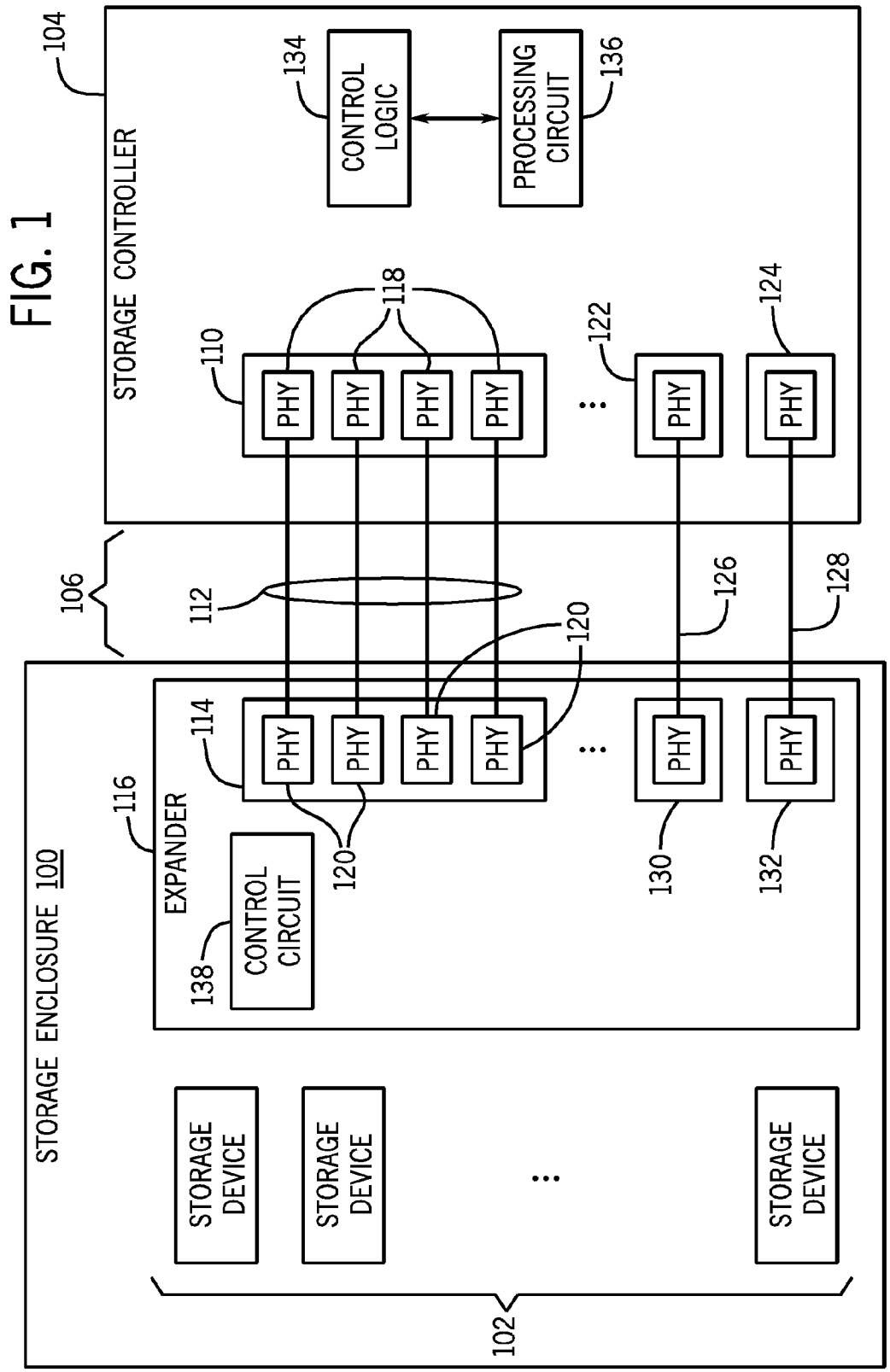
FIGS. 1 and 2 are block diagrams of example arrangements that include a storage controller, in accordance with some implementations.

In some implementations, a storage system can include devices that operate according to a Serial Attached Small Computer System Interface (SAS or Serial Attached SCSI) technology. SAS defines a protocol to move data to and from storage devices, and is defined by the Technical Committee of the International Committee for Information Technology Standards (INCITS). SAS provides a point-to-point architecture that transfers data to and from storage devices by using serial communication (where data is communicated one bit at a time). Although reference is made to the SAS technology in the ensuing discussion, it is noted that in alternative implementations, a storage system can include devices configured to operate according to other storage protocols.

The storage devices of a storage system can be of different types, and/or can have of different capacities and/or operating speeds. For example, some storage devices can be disk-based storage devices that include rotational media. In other examples, storage devices can include solid state storage devices, such as flash memory. Different types of storage devices can have different performance characteristics (e.g. access speed, storage capacity, etc.). For example, disk-based storage devices can have slower storage access speeds than solid state storage devices. Storage devices of the same type can also have different performance characteristics. For example, some disk-based storage devices can have faster access speeds than other disk-based storage devices. Different solid state storage devices can also have different performance characteristics.

In a storage system, a storage controller can be coupled to a collection of storage devices over multiple lanes. In some cases, the multiple lanes can be shared among the storage devices of the collection. In some examples, requests (read requests, write requests, etc.) are processed by the storage controller without assigning different priorities to requests targeted to different storage devices having different performance characteristics. For example, storage requests submitted to relatively slow disk-based storage devices can be handled similarly by the storage controller as storage requests submitted to solid state devices, which have higher access speeds than the slower disk-based storage devices. In some scenarios, if there are a relatively large number of storage requests for lower-speed disk-based storage devices, the resources (e.g. lanes, transceivers, etc.) between the storage controller and the collection of storage devices can be over-consumed by the storage requests for the lower-speed disk-based storage devices, which can prevent timely processing of storage requests for higher-speed solid state storage devices.

In accordance with some implementations, to address the foregoing issues, certain storage devices of a collection can be assigned a higher priority than other storage devices of the collection. In some cases, a group of higher-priority storage devices (e.g. solid state storage devices) can be assigned a dedicated set of lane(s) between the storage controller and the collection of storage devices. The dedicated set of lane(s) is used just for storage requests for the group of storage devices, which is assigned the higher priority. The remaining storage devices (which can be considered another group associated with a lower priority) of the collection can share the remaining lanes. In some implementations, multiple sets of dedicated lanes can be allocated to respective different groups of storage devices.

The multiple lanes over which storage requests are sent can be connected to a "wide port" of the storage controller. According to SAS, a wide port is a port that has more than one phy, where a phy is a physical layer interface used to perform communications over a respective physical link. In the SAS context, the multiple lanes between a storage controller and storage devices can be implemented as physical links. A physical link according to SAS can be implemented as a set of multiple wires (e.g. four wires) to provide respective differential signal pairs (e.g. two differential signal pairs). A differential signal pair refers to a pair of wires that are used to transmit a differential signal. One differential signal pair of a physical link transmits signals in one direction, while the other differential signal pair of the physical link transmits signals in the opposite direction. Data can be transmitted in both directions simultaneously over a physical link. A phy contains a transmitter to transmit a differential signal, and a receiver to receive a differential signal.

Although reference is made to specific examples of a physical link to interconnect a storage controller and a storage device, it is noted in alternative implementations, different types of physical links can be employed. In other examples, other types of lanes according to other storage protocols can be used.

In the ensuing discussion, reference is made to physical links and ports according to SAS. However, it is noted that techniques or mechanisms according to some implementations can be applied in other contexts.

In accordance with some implementations, to allocate a dedicated set of physical link(s) from among physical links connected to a wide port, the wide port can be divided into multiple smaller ports. Once the wide port is divided into smaller ports, one of the smaller ports can be assigned for storage requests associated with a particular group of storage devices, while another of the smaller ports can be used for storage requests associated with the remaining storage devices. In other examples, there can be more than two smaller ports divided from the wide port, such that the more than two smaller ports can be allocated for dedicated use by corresponding more than two groups of storage devices.

FIG. 1 is a block diagram of an example arrangement that includes a storage enclosure 100 that has a number of storage devices 102. A "storage enclosure" can refer to any subsystem that includes multiple storage devices, whether the subsystem has a single chassis that contains the storage devices, or multiple chassis that contain respective subsets of the storage devices.

A storage controller 104 is coupled to the storage enclosure 100 over an interconnect 106, which includes physical links. In examples where the storage devices 102 can be grouped into respective arrays of storage devices, the storage controller 104 can be referred to as an array controller. In some examples, an array of storage devices can be used to implement a RAID (redundant array of independent disks) storage arrangement. There can be multiple levels of RAID, such as RAID 1 (to provide a group of storage devices that are able to mirror data), RAID 5 or 6 (to perform block-level striping of data across an array of storage devices), and so forth. In other examples, other types of arrays or groups of storage devices can be defined.

In the SAS context, various devices that can communicate with each other include initiators, targets, and expanders. An initiator is able to access a target to perform a requested action, such as to read or write data. A target refers to a device that responds to a request from an initiator by performing the requested action, such as to read data or write data. An expander routes requests and data between initiators and targets. In the example of FIG. 1, the storage controller 104 can be considered an initiator, the storage devices 102 can be considered targets, and an expander 116 is provided between the storage controller 104 and the storage devices 102.

In examples according to FIG. 1, the storage controller 104 has a wide port 110 that is connected over respective physical links 112 to a corresponding wide port 114 of the expander 116 that is part of the storage enclosure 100. The group of physical links 112 that are connected to the wide ports 110 and 114 can also be referred to as a wide link.

In alternative implementations, instead of coupling the storage controller 104 to the storage enclosure 100 as depicted in FIG. 1, a switch can be provided between the storage controller 104 and the storage enclosure 100, where the switch can include an expander that is similar to the expander 116 depicted in FIG. 1. The switch allows one or multiple storage controllers to selectively communicate with one or multiple storage enclosures.

The wide port 110 of the storage controller 104 has multiple phys 118, while the wide port 114 of the expander 116 has multiple phys 120. In examples according to FIG. 1, the storage controller 104 also includes narrow ports 122 and 124, where a narrow port includes just one phy. The narrow ports 122 and 124 of the storage controller 104 are connected over respective physical links 126 and 128 to corresponding narrow ports 130 and 132 of the expander 116.

The storage controller 104 includes control logic 134 to perform various tasks associated with the storage controller 108, such as tasks associated with managing storage requests targeted to storage devices 102 of the storage enclosure 100. Upon receiving a particular request targeting a storage device or group of storage devices 102, the control logic 134 can determine which port to send the request through. Data retrieved from the target storage device or group of storage devices is returned to the same port through which the request was transmitted.

In some examples, the control logic 134 can be implemented as machine-readable instructions that are executable on a processing circuit 136. The processing circuit 136 can be an application specific integrated circuit (ASIC), a programmable gate array (PGA), a microcontroller, a microprocessor, and so forth. The machine-readable instructions making up the control logic 134 can be stored in embedded storage of the storage controller 104, or can be stored in an external storage and loaded for execution in the storage controller 104. In alternative examples, instead implementing the control logic 134 as machine-readable instructions, the control logic 134 can be implemented as physical circuitry configured to perform tasks of the storage controller 104.

The expander 116 of the storage enclosure 100 includes a control circuit 138, which can be implemented as physical circuitry. Alternatively, the control circuit 134 can be implemented as control logic that includes machine-readable instructions executable on a processing circuit.

In accordance with some implementations, the control logic 134 of the storage controller 104 can be configured to divide a wide port, such as the wide port 110, into smaller ports. This re-configuration of a wide port can be responsive to control input from an entity outside the storage controller 104.

Figure 2:
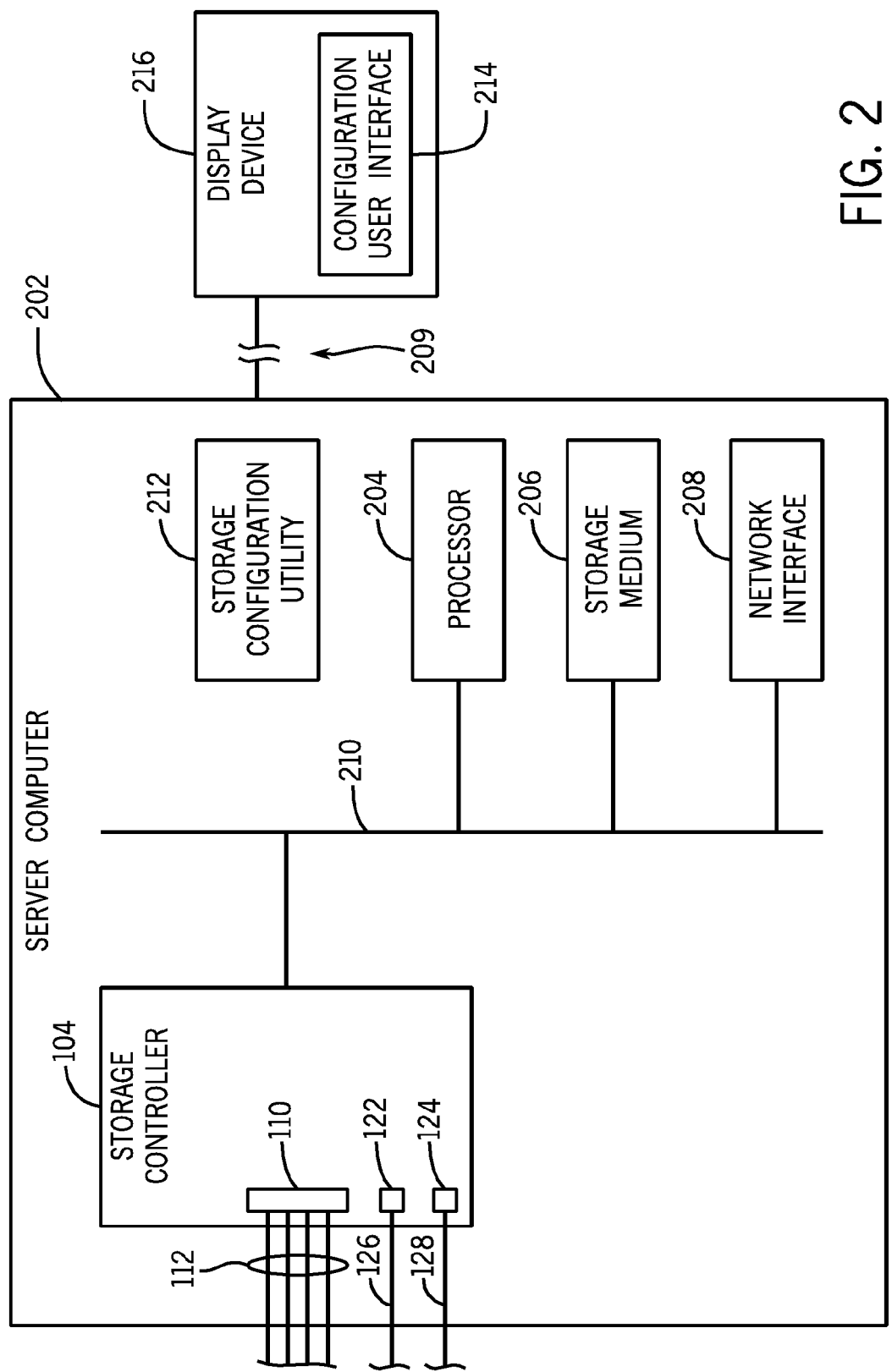

In accordance with further implementations, as shown in FIG. 2, the storage controller 104 of FIG. 1 can be included in a server computer 202, which also has a processor (or multiple processors) 204, a storage medium (or storage media) 206, and a network interface 208 to allow the server computer 202 to communicate over a data network 209. The storage controller 104, processor 204, storage medium 206, and network interface 208 can be coupled by an interconnect bus (or interconnect buses) 210.

In some examples, the storage controller 104 can be a chip or board that is mounted in a slot or other receptacle on a circuit board of the server computer 202. In other examples, the storage controller 104 can be directly mounted to the circuit board of the server computer 202.

In addition, the server computer 202 includes a storage configuration utility 212, which can be used to perform various configuration tasks with respect to the storage controller 104. The storage configuration utility 212 can be implemented as machine-readable instructions executable on the processor(s) 204.

Among the configuration tasks that can be performed by the storage configuration utility 212 is a task for dividing a wide port, such as the wide port 110, into smaller ports. As discussed above, dividing the wide port into smaller ports allows at least one of the smaller ports to be dedicated to a particular group of storage devices of the storage enclosure 100.

Note also that the storage configuration utility 212 can also be used to receive user input regarding the creation of a wide port at the storage controller 104. For example, a user can specify that a wide port having a number of phys (connected to respective physical links) is to be provided at the storage controller 104.

The storage configuration utility 212 is able to cause a configuration user interface 214 (which can be a graphical user interface, for example) to be presented in a display device 216. In some examples, the display device 216 can be connected to the server computer 202. In other examples, the display device 216 is connected to a client device that is able to access the server computer 202 over a data network. The configuration user interface 214 presents an interface in which a user can view storage devices of the storage enclosure 100 (FIG. 1). Also, the configuration user interface 214 presents user-selectable command elements that allow the user to perform various tasks, such as any one or a combination of the following: grouping of storage devices in the storage enclosure 100, such as to form arrays of storage devices; defining a wide port; specifying that a portion of a wide port is to be dedicated to a group of storage devices; and so forth.

Note that the groups (e.g. arrays) of storage devices that are created by the user using the configuration user interface 214 can be groups of different types of storage devices, such as a first group of solid state devices, a second group of SAS storage devices, and so forth.

As noted above, using the configuration user interface 214 presented by the storage configuration utility 212, the user can also specify a portion of the wide port (e.g. 110) that is to be dedicated to a particular group (e.g. array) of storage devices. For example, for a 4× wide port (a wide port having four phys connected to form respective physical links), the user can specify that 0%, 25%, 50%, or 75% of the 4× wide port is to be dedicated to the particular group of storage devices. A specified value of 0% would mean that no portion of the wide port is dedicated to the particular group of storage devices, such that the entire wide port would be shared equally by the storage devices 102 of the storage enclosure 100. A specified value of 25% would mean that one phy out of the four phys would be dedicated to the particular group. In other examples, instead of specifying percentages of a wide port to dedicate to a particular group of storage devices, the user can instead specify a portion of the wide port to be dedicated in terms of a number of phys or a number of lanes to dedicate to the particular group.

In response to a user input specifying a portion of a wide port to dedicate to the particular group of storage devices, the storage configuration utility 212 sends a corresponding indication to the storage controller 104. The storage controller 104 (e.g. the control logic 134 in the storage controller 104) uses the indication to divide the wide port into a number of smaller ports.

Instead of defining groups of storage devices and dividing a wide port into smaller ports based on user input through the configuration user interface 214, in alternative examples, the storage configuration utility 212 is able to automatically define groups of storage devices and/or divide a wide port into smaller ports based on predefined criteria and detected conditions of the storage system, without user input.

Figure 3:
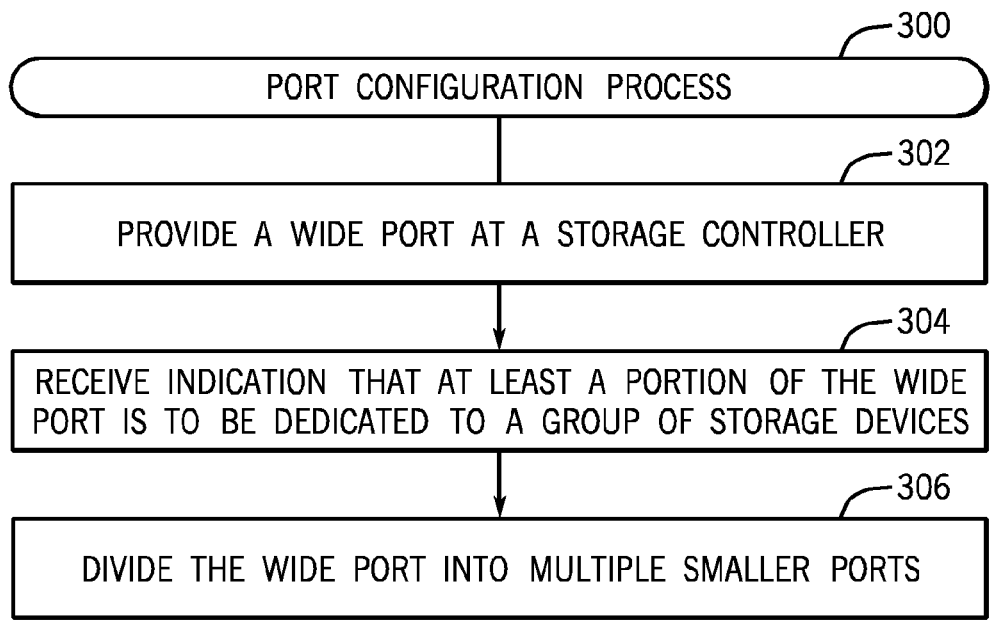
FIG. 3 is a flow diagram of a port configuration process according to some implementations.

FIG. 3 is a flow diagram of a port configuration process 300 according to some implementations. The process 300 can be performed by the storage controller 104, in some examples. The process 300 provides (at 302), at the storage controller 104, a wide port (e.g. 110) that is associated with multiple physical links 112 for communication with the storage enclosure 100. Providing a wide port at a storage controller can be performed during a setup phase, using SAS protocols. For example, a user can designate a group of phys to be included in a wide port. This group of phys (and correspondingly the wide port) would be associated with a common SAS address. A SAS address is an example of an identifier that is used for identifying a port. In some examples, a SAS address can also be used to identify an expander.

The storage controller receives (at 304) an indication that at least a portion of the wide port, and respective phy(s) and physical link(s), is to be dedicated to a group of the storage devices 102. This indication can be received from the storage configuration utility 212, such as due to a user selection or entry made in the configuration user interface 214 presented by the storage configuration utility 212.

In response to the received indication, the storage controller 104 divides (at 306) the wide port into multiple smaller ports. The smaller ports are allocated to respective groups of the storage devices 102. At least one of the smaller ports can be considered a dedicated port that is dedicated to a specific group of one or multiple storage devices 102.

Figure 4:
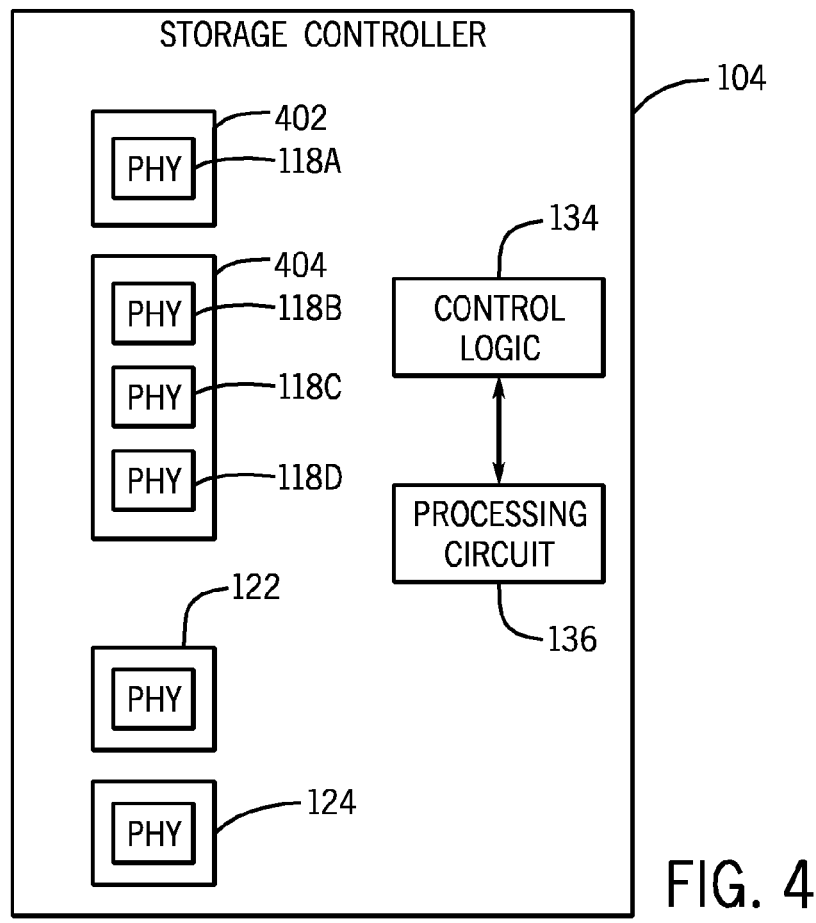
FIG. 4 is a block diagram of a storage controller after a wide port has been divided into smaller ports, in accordance with some implementations.

FIG. 4 illustrates an arrangement of the storage controller 104 after division of the wide port 110 of FIG. 1 or 2 into multiple smaller ports 402 and 404. In examples according to FIG. 4, the smaller port 402 is a narrow port that has one phy 118A, while the smaller port 404 is a wide port that has three phys 118B, 118C, and 118D. In alternative examples, the smaller port 402 can be configured to be a wide port that has multiple phys.

In some implementations, for a set of phys to be grouped into a wide port, they are configured with the same SAS address and be attached to the same device (e.g. storage controller 104 or expander 116). For example, if four phys of the storage controller 104 are configured to have the same SAS address, then they are grouped into a 4× wide port. To divide a wide port into smaller ports, in some implementations, the storage controller 104 creates a dedicated smaller port by first re-configuring the phy(s) that is (are) to be dedicated to a different SAS address. For example, if a 1× portion of a 4× port of the storage controller 104 is to be dedicated, then the storage controller 104 reconfigures one of the four phys with a new SAS address. A reset can then be performed, which causes the creation of two smaller ports of phys that were previously in the wide port: a 3× port using the SAS address shared by the three phys whose SAS address has not been changed, and a dedicated 1× port using the newly assigned SAS address. Effectively, after the wide port 110 is divided into the smaller ports 402 and 404 as shown in FIG. 4, the smaller ports 402 and 404 are assigned corresponding different SAS addresses.

Communications in the storage system that includes the storage controller 104 and the storage enclosure 100 of FIG. 1 can use addresses of phys. For example, an address of an initiator phy and an address of a target phy can be used to establish a connection between the initiator phy and the target phy. An address of a phy is also used to route information (a request or data, for example) in the storage system.

Figure 5:
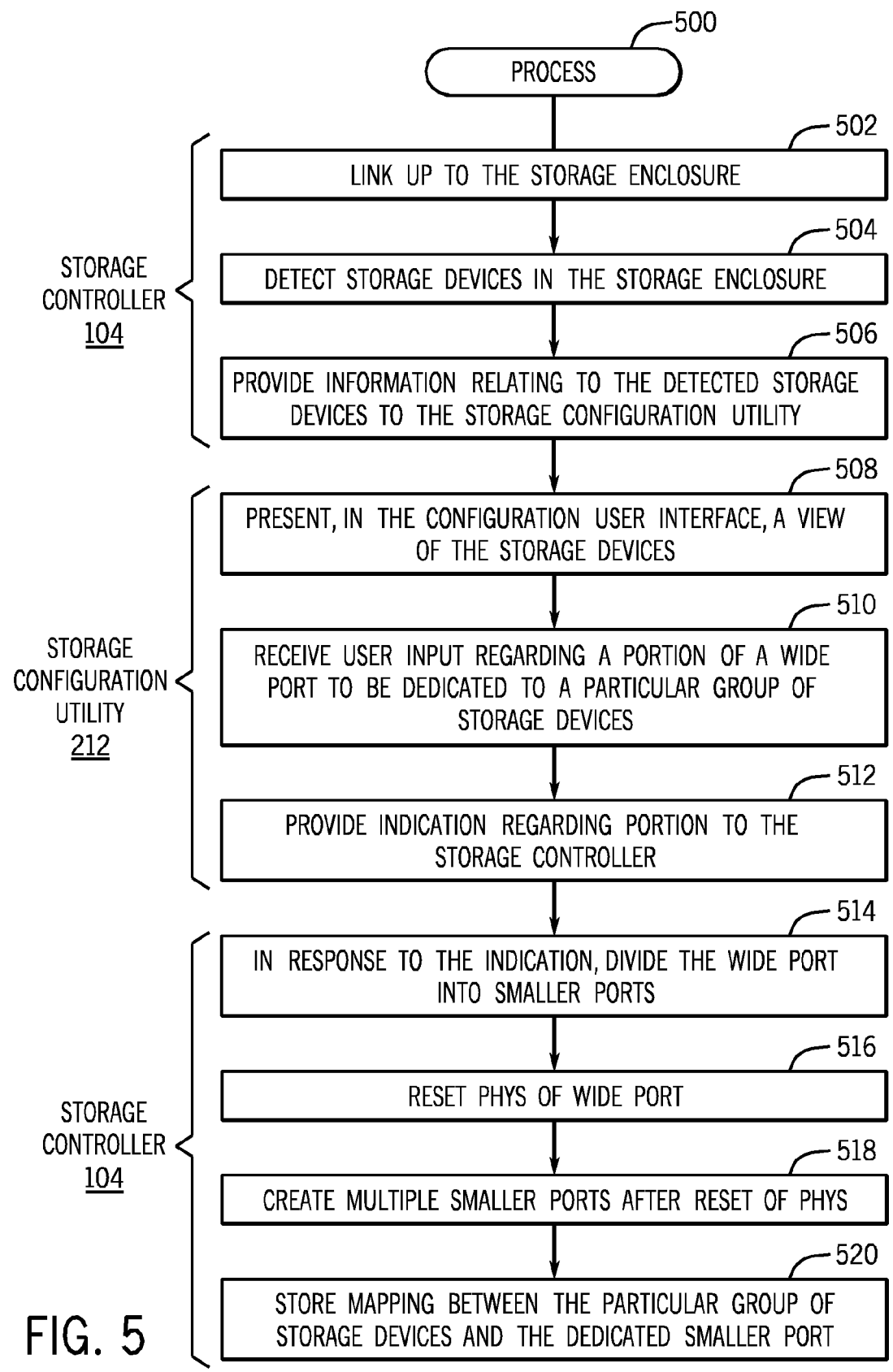
FIG. 5 is a flow diagram of a process according to further implementations.

FIG. 5 is a flow diagram of a process 500 according to further implementations. The process 500 can be performed by entities in the server computer 202 of FIG. 2, in accordance with some examples. When the storage controller 104 of the server computer 202 first starts up, the storage controller 104 links up (at 502) to the storage enclosure 100 using SAS procedures, for example. Next, the storage controller 104 detects (at 504) the storage devices 102 in the storage enclosure 100. The storage controller 108 can in turn provide (at 506) information relating to the detected storage devices 102 to the storage configuration utility 212.

In response to the information relating to the storage devices from the storage controller 104, the storage configuration utility 142 can present (at 508), in the configuration user interface 214, a view of the storage devices 102 that are available in the storage enclosure 100. The view can be a list of the storage devices 102, or some other depiction of the storage devices. A user can use the configuration user interface 214 to create groups (e.g. arrays) of storage devices.

The storage configuration utility 212 can also receive (at 510) user input regarding a portion of a wide port to be dedicated to a particular group of storage devices. The storage configuration utility 212, in response to such user input, can provide (at 512) an indication to the storage controller 104 to cause the storage controller 104 to divide (at 514) the wide port into smaller ports. In some implementations, the storage configuration utility 212 can also specify that the group of storage devices that is dedicated to a smaller port divided by the wide port is to be assigned a higher quality of service than other storage devices in the storage enclosure.

Once the division of the wide port is configured in the storage controller 108, which can be accomplished by programming a data structure in the storage controller 104 to particular values, the storage controller 104 can reset (at 516) the phys of the wide port. When the phys of the wide port restart after the reset, the storage controller 104 is able to create (at 518) multiple smaller ports using corresponding subsets of the phys of the original wide port.

The storage controller 104 also stores (at 520) a mapping between the particular group of storage devices and the dedicated port for that particular group. When a storage request is to be sent to a storage device in that particular group, then the storage controller 108 (and more specifically the control logic 134 of the storage controller 108) routes the storage request to the dedicated port using the mapping. Once the storage enclosure processes the storage request, the storage enclosure 100 sends responses back to the same port through which the storage request was received.

Using technique or mechanisms according to some implementations, quality of service for different groups of storage devices can be implemented, by dedicating one or multiple smaller ports divided from a wide port to the respective group(s) of storage devices.

Machine-readable instructions of modules described above (such as the control logic 134 and storage configuration utility 212 of FIG. 1 or 2) are loaded for execution on a processor or multiple processors. A processor can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   providing, at a storage controller, a given port associated with a plurality of lanes for communication with a storage subsystem having a plurality of storage devices;
   receiving, by the storage controller, an indication based on user input that at least a portion of the given port is to be dedicated to a group of at least one of the storage devices; and
   dividing, by the storage controller, the given port into multiple smaller ports, in response to the received indication,
   wherein the given port is assigned an address, and wherein dividing the given port into the multiple smaller ports causes assignment of different addresses to the respective smaller ports.

2. The method of claim 1, wherein the addresses assigned to the given port and to the smaller ports comprise Serial Attached Small Computer System Interface (SAS) addresses.

3. The method of claim 1, wherein the given port is a SAS wide port having a plurality of phys, and each of the smaller ports has a respective smaller number of phys than the wide port.

4. The method of claim 3, wherein at least one of the smaller ports is a narrow port having a single phy.

5. The method of claim 3, wherein at least one of the smaller ports is a wide port having multiple phys.

6. The method of claim 1, wherein receiving the indication comprises receiving the indication from a configuration utility in response to the user input regarding the portion of the given port to be dedicated, the method further comprising:
   using the configuration utility to define groups of the storage devices.

7. The method of claim 1, further comprising:
   assigning a higher priority to the group of at least one storage device than another group of the storage devices.

8. The method of claim 1, wherein the address assigned to a first of the multiple smaller ports is the address assigned the given port, and the address assigned to a second of the multiple smaller ports is an address different from the address assigned the given port.

9. A storage controller to manage access of storage devices, comprising:
   a plurality of phys;
   a wide port including multiple ones of the plurality of phys; and
   control logic to:
   receive an indication based on user input that at least a portion of the wide port is to be dedicated to a group of at least one of the storage devices; and
   divide the wide port into multiple smaller ports, in response to the received indication, where one of the smaller ports is dedicated to the group of at least one storage device, wherein the wide port is assigned an address, and wherein after dividing the wide port into the multiple smaller ports, the multiple smaller ports are assigned respective different addresses.

10. The storage controller of claim 9, wherein the wide port is a Serial Attached Small Computer System Interface (SAS) wide port.

11. The storage controller of claim 9, wherein the phys of the wide port are to communicate over physical links with corresponding phys of an expander that is coupled to the storage devices.

12. The storage controller of claim 9, wherein the indication is to be received from a configuration utility in response to the user input in a user interface.

13. The storage controller of claim 12, where the control logic is to detect the storage devices that are in an enclosure, and to provide information regarding the detected storage devices to the configuration utility to present in the user interface.

14. The storage controller of claim 9, further comprising a mapping to map the at least one storage device in the group to the one smaller port, wherein the control logic is to use the mapping to route a storage request through the one smaller port.

15. The storage controller of claim 14, wherein the storage controller is to receive a response to the storage request through the one smaller port.

16. The storage controller of claim 9, wherein the storage controller is to communicate with the storage devices through a switch.

17. The storage controller of claim 9, wherein the address assigned to a first of the multiple smaller ports is the address assigned the wide port, and the address assigned to a second of the multiple smaller ports is an address different from the address assigned the wide port.

18. An article comprising at least one non-transitory machine-readable storage medium storing instructions that upon execution cause a system to:

present a user interface by a configuration utility;

receive input through the user interface regarding a portion of a wide port of a storage controller that is to be dedicated to a respective group of at least one storage device from among plural storage devices;

in response to the input, send, by the configuration utility, an indication to the storage controller to cause the storage controller to divide the wide port into smaller ports, wherein dividing the wide port into the smaller ports causes assignment of corresponding different addresses to the smaller ports.

19. The article of claim 18, wherein the address assigned to a first of the smaller ports is the address assigned the wide port, and the address assigned to a second of the smaller ports is an address different from the address assigned the wide port.

* * * * *